(12) United States Patent
Lin et al.

(10) Patent No.: US 8,114,323 B2
(45) Date of Patent: Feb. 14, 2012

(54) PH-ADJUSTING TEXTILE CONTAINING AMPHOTERIC POLYMER COMPOSITE NANOPARTICLES

(75) Inventors: Jia-Peng Lin, Hsin Chuang (TW);
Pui-Leng Lai, Tu Cheng (TW);
Wan-Ling Lu, Kaohsiung (TW);
Ding-Han Huang, Hualien (TW);
Chao-Huei Liu, Taipei (TW);
Chun-Hung Lin, Tucheng (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 0 days.

(21) Appl. No.: 13/008,217

(22) Filed: Jan. 18, 2011

(65) Prior Publication Data

US 2011/0146039 A1    Jun. 23, 2011

Related U.S. Application Data

(62) Division of application No. 11/647,040, filed on Dec. 28, 2006, now Pat. No. 7,892,994.

(30) Foreign Application Priority Data

Sep. 14, 2006    (TW) ................................ 95134108 A

(51) Int. Cl.
*D01D 5/40* (2006.01)
*B29B 9/06* (2006.01)
*D01F 1/02* (2006.01)
*D04H 1/00* (2006.01)
*D04H 3/00* (2006.01)
*D04H 5/00* (2006.01)
*D04H 13/00* (2006.01)
*B32B 5/16* (2006.01)
*B32B 25/02* (2006.01)
*B32B 25/10* (2006.01)

(52) U.S. Cl. ........ 264/141; 264/140; 264/143; 264/211; 442/414; 442/416; 442/417; 428/296.7

(58) Field of Classification Search .................. None
See application file for complete search history.

(56) References Cited

U.S. PATENT DOCUMENTS

| 4,600,545 A * | 7/1986 | Galli et al. ........................ 264/11 |
| 2005/0153134 A1 * | 7/2005 | Sasaki et al. .................. 428/402 |

FOREIGN PATENT DOCUMENTS

JP    63090521    4/1988

OTHER PUBLICATIONS

English language translation of abstract of JP 63090521 (published Apr. 21, 1988).

* cited by examiner

*Primary Examiner* — Christina Johnson
*Assistant Examiner* — Benjamin Schiffman
(74) *Attorney, Agent, or Firm* — Thomas, Kayden, Horstemeyer & Risley, LLP

(57) ABSTRACT

Amphoteric polymer composite nanoparticles are added into the polymer grains of synthetic fibers. The synthetic fibers are woven to form a textile capable of adjusting pH value.

7 Claims, 2 Drawing Sheets

PH-ADJUSTING TEXTILE CONTAINING AMPHOTERIC POLYMER COMPOSITE NANOPARTICLES

CROSS-REFERENCE TO RELATED APPLICATION

The present application is a divisional application of U.S. application Ser. No. 11/647,040, filed Dec. 28, 2006, and claims priority to Taiwanese Application Serial Number 95134108, filed Sep. 14, 2006. The entire disclosures of all the above applications are hereby incorporated by reference herein.

BACKGROUND

1. Field of Invention

The present invention relates to a functional textile. More particularly, the present invention relates to a textile capable of adjusting pH value and a producing method thereof.

2. Description of Related Art

Most of common textiles capable of adjusting pH value use pH adjusting agents in micron meter level, such as zinc salts having at least a carboxylic acid group or an amine group. The pH adjusting agent is usually added during a process, such as dipping and padding, coating, or wet spinning, to have the pH adjusting agent attached on the textile, so that the textile is capable of adjusting pH value. However, the effective amount needs to be more than 5% by weight. In addition, the washing fastness of the textile processed by coating is poor, and the wet spinning method has solvent recycling problem.

SUMMARY

According to one embodiment of the present invention, amphoteric polymer composite nanoparticles are prepared by emulsion polymerization. A first monomer is added into water to process emulsion polymerization to form polymer cores in an emulsion dispersion solution. A second monomer having at least a carboxylic acid group (—COOH) and a third monomer having at least an amine group (—NH$_2$) are then respectively added into the emulsion dispersion solution to respectively form first shell polymer chains and second shell polymer chains attached on surfaces of the polymer cores to obtain amphoteric polymer composite nanoparticles. The amphoteric polymer composite nanoparticles have a diameter less than 1 μm.

In the preparation method described above, the first, second, and third monomer can be styrene, acrylic acid, and acrylamide, respectively. Alternatively, styrene and acrylamide can be co-polymerized to form the polymer cores, too.

According to one embodiment of the present invention, amphoteric polymer composite nanoparticles are synthesized. The structure of the amphoteric polymer composite nanoparticles comprises a polymer core surrounded by a polymer shell. The polymer shell comprises a first polymer having at least a carboxylic acid group and a second polymer having at least an amine group.

The polymer core described above can be polystyrene or copolymer of styrene and acrylamide. The first polymer comprises polyacrylic acid, and the second polymer comprises polyacrylamide.

According to one embodiment of the present invention, polymer grains of synthetic fibers containing amphoteric polymer composite nanoparticles and a producing method thereof are provided. The amphoteric polymer composite nanoparticles described above are mixed with polymer powder of synthetic fibers to form a mixture. The mixture is then melted, compounded, extruded, cooled, and cut to obtain polymer grains containing the amphoteric polymer composite nanoparticles.

The polymer powder of synthetic fibers can be, for example, poly ethylene terephthalate (PET), polybutylene terephthalate (PBT), nylon, polypropylene (PP), or polyethylene (PE). The added amount of the amphoteric polymer composite nanoparticles is about 100 to about 10,000 ppm.

According to one embodiment of the present invention, a textile capable of adjusting pH value and a producing method thereof are also provided. The polymer grains described above can be processed by melt-spinning and weaving or melt-blown to form textiles or nonwoven textiles, respectively.

It is to be understood that both the foregoing general description and the following detailed description are made by use of examples and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
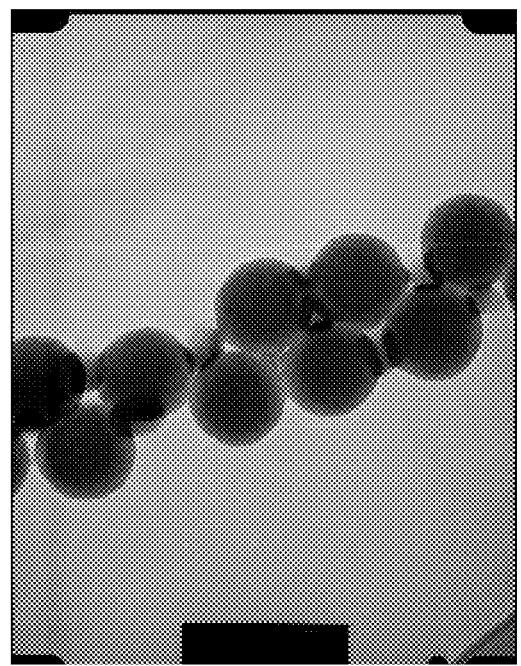
FIG. 1 is a transmission electron microscope (TEM) photograph of the amphoteric polymer composite nanoparticles.

The amphoteric polymer composite nanoparticles prepared according to one embodiment of the present invention is capable of adjusting pH value and thermally stable up to, at least, 300° C. Hence, the amphoteric polymer composite nanoparticles can be applied on melt spinning or melt blowing, and the function of adjusting pH value can be obtained by adding less than 0.1 wt % of the amphoteric polymer composite nanoparticles.

Preparation Method of Amphoteric Polymer Composite Nanoparticles

A preparation method of amphoteric polymer composite nanoparticles is provided. The amphoteric polymer composite nanoparticles is prepared by emulsion polymerization. A first monomer is added into water to process emulsion polymerization to form polymer cores in an emulsion dispersion solution. A second monomer having at least a carboxylic acid group (—COOH) and a third monomer having at least an amine group (—NH$_2$) are then added into the emulsion dispersion solution to respectively form first shell polymer chains and second shell polymer chains attached on surfaces of the polymer cores to obtain amphoteric polymer composite nanoparticles. The amphoteric polymer composite nanoparticles have a diameter less than 1 μm.

In one embodiment, the first, second, and third monomers can be styrene, acrylic acid, and acrylamide, respectively. In another embodiment, styrene and acrylamide can be co-polymerized to form the polymer cores, wherein the molar ratio of the added styrene over the added acrylamide is about 0.1 to about 0.25.

The molar ratio of the second and the third monomers can be adjusted to adjust pH of a solution within various ranges. For example, when a desired pH range is about 3 to about 5 and the second and the third monomers are acrylic acid and acrylamide, respectively, the molar ratio of the added acrylamide over the added acrylic acid is about 1.5 to about 2.5. When a desired pH range is about 7 to about 9 and the second and the third monomers are acrylic acid and acrylamide, respectively, the molar ratio of the added acrylamide over the added acrylic acid is about 0.1 to about 1.

A catalyst can be added during the emulsion polymerization of the first, second, and/or third monomer to increase the polymerization rate. A cross-link agent can be added during the emulsion polymerization of the second and/or the third monomer to allow cross-linking between different polymer chains to form a network structure. The catalyst described above can be, for example, potassium persulfate or ammonium persulfate. The cross-link agent can be, for example, N,N'-methylene bisacrylamide.

The emulsion polymerization temperature of the various monomers described above is about 50 to about 90° C. The emulsion polymerization is performed for about 6 to about 50 hours.

A working example of the amphoteric polymer composite nanoparticles is described below.

45.4 gram of styrene monomer and 4 gram of acrylamide monomer were dispersed in 3,300 gram of water. 4 gram of potassium persulfate was added to process emulsion polymerization without adding any emulsion agent under nitrogen atmosphere at a temperature of about 70° C. After 2 hours, 15 gram of acrylamide monomer was added to continue the emulsion polymerization for about 20 hours to obtain an emulsion dispersion solution. The emulsion dispersion solution was added into 3,000 gram of water. Then, 20 gram of acrylic acid and 0.2 gram of N,N'-methylene bisacrylamide were added to react under 3° C. for about 24 hours. Next, 4 gram of potassium persulfate was added to react under 60° C. for about 24 hours to obtain amphoteric polymer composite nanoparticles having a polymer core made of copolymer of styrene and acrylamide and a polymer shell made of polyacrylic acid and polyacrylamide. Then, the amphoteric polymer composite nanoparticles were analyzed by a transmission electron microscope (TEM), thermal gravimetric analysis (TGA), differential scanning calorimetry (DSC) to understand properties of the amphoteric polymer composite nanoparticles.

FIG. 1 is a TEM photograph of the amphoteric polymer composite nanoparticles described above. In FIG. 1, the diameter of the amphoteric polymer composite nanoparticles was measured to be about 200 nm. Moreover, the size of the amphoteric polymer composite nanoparticles was quite uniform, and the shape of the amphoteric polymer composite nanoparticles was about spherical.

Figure 2:
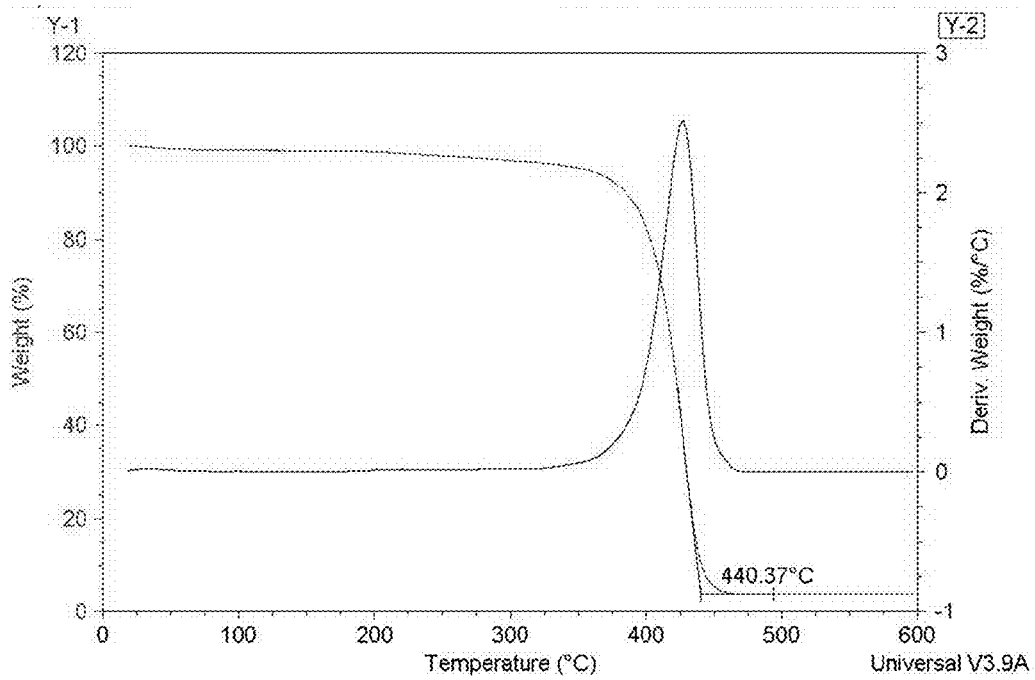
FIG. 2 is a thermal gravimetric analysis (TGA) diagram of the amphoteric polymer composite nanoparticles.

FIG. 2 is a TGA diagram of the amphoteric polymer composite nanoparticles described above. In FIG. 2, it can be observed that the amphoteric polymer composite nanoparticles was not pyrolyzed up to about 350° C.

Figure 3:
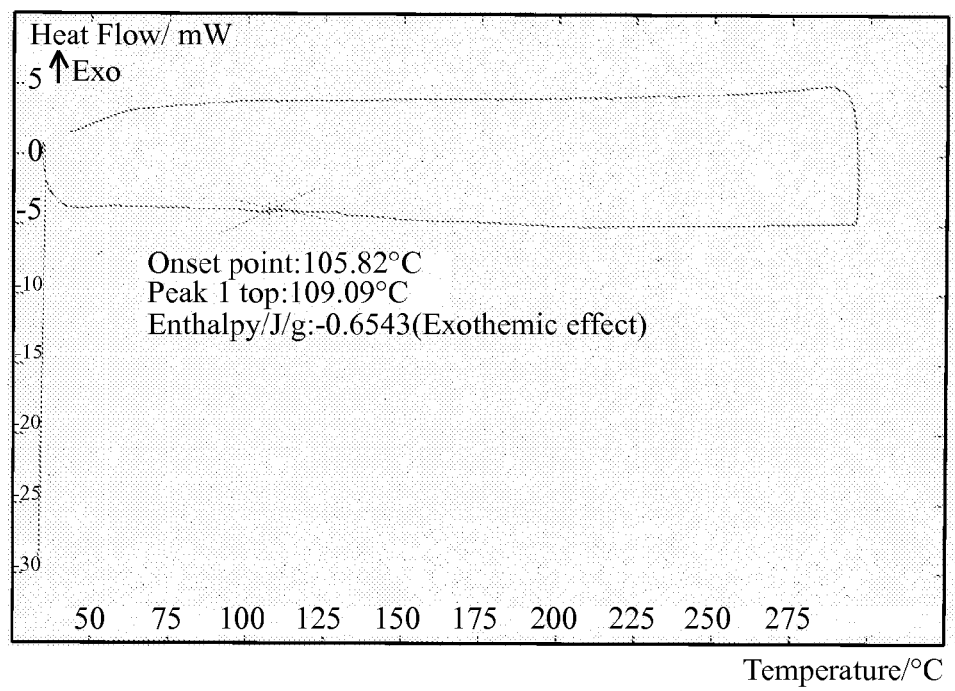
FIG. 3 is a differential scanning calorimetry (DSC) diagram of the amphoteric polymer composite nanoparticles.

FIG. 3 is a DSC diagram of the amphoteric polymer composite nanoparticles described above. There was no exothermic or endothermic peaks appeared under a temperature less than 300° C. It shows that the amphoteric polymer composite nanoparticles did not melt under a temperature less than 300° C.

From FIGS. 2 and 3, the amphoteric polymer composite nanoparticles having a polymer core made of copolymer of styrene and acrylamide and a polymer shell made of polyacrylic acid and polyacrylamide were thermally stable up to, at least, 300° C. Hence, the amphoteric polymer composite nanoparticles can endure high melt spinning or melt blowing temperature, so the original properties can be maintained.

Producing Method of Polymer Grains of Synthetic Fibers Containing Amphoteric Polymer Composite Nanoparticles According to one embodiment of this invention, the amphoteric polymer composite nanoparticles described above were mixed with polymer powder of synthetic fibers to form a mixture. The mixture was then melted, compounded, extruded, cooled, and cut to obtain polymer grains containing the amphoteric polymer composite nanoparticles.

The polymer powder of synthetic fibers can be, for example, poly ethylene terephthalate (PET), polybutylene terephthalate (PBT), nylon, polypropylene (PP), or polyethylene (PE). The added amount of the amphoteric polymer composite nanoparticles is about 100 to about 10,000 ppm.

Example 1

In Example 1, the obtained amphoteric polymer composite nanoparticles having a polymer core made of copolymer of styrene and acrylamide and a polymer shell made of polyacrylic acid and polyacrylamide in the working example as described above was mixed with PET powder. The mixture was then melted, compounded, extruded, cooled, and cut to obtain PET grains containing the amphoteric polymer composite nanoparticles. The concentration of the amphoteric polymer composite nanoparticles in the PET grains was about 200 ppm.

The PET grains was then melt-spun to obtain PET fibers containing the amphoteric polymer composite nanoparticles. The PET fibers were woven to obtain a PET textile containing the amphoteric polymer composite nanoparticles.

1 gram of the PET textile was impregnated in 10 mL aqueous solution of various pH values. After 1 hour, the PET textile was taken out, and the pH value of the remaining aqueous solution was measured. The measured result was listed in Table 1. From Table 1, the pH adjusting effect of the PET textile containing the amphoteric polymer composite nanoparticles was quite obvious. The aqueous solution of pH 4.25-9.18 can be adjusted to a solution with narrower pH range of 5.18-6.2.

TABLE 1

| pH value before adjusting | 4.25 | 5.23 | 6.21 | 7.15 | 8.03 | 9.18 |
|---|---|---|---|---|---|---|
| pH value after adjusting | 5.18 | 5.17 | 5.18 | 5.45 | 5.4 | 6.2 |

Example 2

In example 2, the obtained amphoteric polymer composite nanoparticles having a polymer core made of copolymer of styrene and acrylamide and a polymer shell made of polyacrylic acid and polyacrylamide in the working example as described above was mixed with PP powder. The mixture was then melted, compounded, extruded, cooled, and cut to obtain PP grains containing the amphoteric polymer composite nanoparticles. The concentration of the amphoteric polymer composite nanoparticles in the PP grains was about 400 ppm. The PP grains was then melt-blown to form a PP nonwoven textile containing the amphoteric polymer composite nanoparticles.

1 gram of PP nonwoven textile was immersed in 10 mL aqueous solution of various pH values. After 1 hour, the PP nonwoven textile was taken out, and the pH value of the remaining aqueous solution was measured. The measured result was listed in Table 2. From Table 2, the pH adjusting effect of the PP nonwoven textile containing the amphoteric polymer composite nanoparticles was quite obvious. The aqueous solution of pH 4.03-9.07 can be adjusted to a solution with narrower pH range of 5.02-7.52.

TABLE 2

| pH value before adjusting | 4.03 | 5.22 | 6.2 | 6.98 | 8.21 | 9.07 |
|---|---|---|---|---|---|---|
| pH value after adjusting | 5.02 | 7.03 | 7.13 | 7.33 | 6.34 | 7.52 |

Adding Nano-Bactericide to Textiles Containing Amphoteric Polymer Composite Nanoparticles A nano-bactericide can be further added to the textile containing amphoteric polymer composite nanoparticles. The nano-bactericide can be, for example, titanium oxide nanoparticels, zinc oxide nanoparticels, or silver nanoparticles. According to one embodiment of this invention, the concentration of the nano-bactericide in the textile is about 50 to about 5,000 ppm.

In one embodiment, the timing of adding the nano-bactericide was during the period of producing the polymer grains of synthetic fibers. Amphoteric polymer composite nanoparticles, a nano-bactericide and polymer powder are mixed to be melted and compounded. After being cooled down and cut, polymer grains containing amphoteric polymer composite nanoparticles and nano-bactericide are obtained. Then, the processes of producing synthetic fibers and textile were performed to obtain a textile containing amphoteric polymer composite nanoparticles and nano-bactericide.

Figure 4:
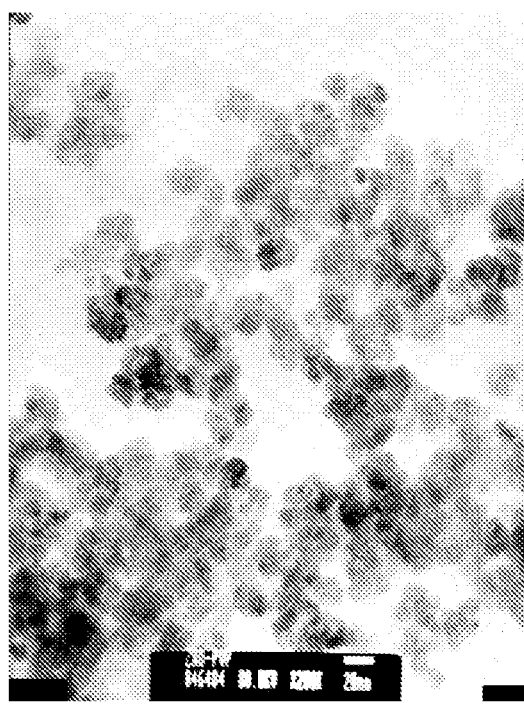
FIG. 4 is a transmission electron microscope photograph of zinc oxide nanoparticels.

For example, zinc oxide nanoparticles can be prepared as follows. A certain amount of an organic zinc salt and an alcohol solvent were mixed to form a 0.001-0.1 M alcohol solution of the organic zinc salt. Alcoholysis reaction was then performed under a temperature of about 80° C. for several hours to form a pre-reactant. The organic zinc salt can be, for example, zinc acetate, and the alcohol solvent can be, for example, methanol, ethanol, propanol, or butanol. The pre-reactant was kept at about 10° C. to inhibit the growth of zinc oxide crystal. About 0.001-0.1 M aqueous solution of metal hydroxide was slowly added into the alcohol solution of the pre-reactant under 10° C. to process condensation reaction for tens of minutes to obtain aqueous solution of zinc oxide nanaparticles. TEM photograph of the zinc oxide nanoparticles is shown in FIG. 4.

The obtained zinc oxide nanoparticles was then respectively added in the mixing step in Example 1 and Example 2 to respectively form PET grains containing 100 ppm zinc oxide nanoparticels and the amphoteric polymer composite nanoparticles, and PP grains containing 200 ppm zinc oxide nanoparticles and the amphoteric polymer composite nanoparticles. The resulted PET grains and the resulted PP grains were then used to respectively produce PET textile and PP nonwoven textile containing amphoteric polymer composite nanoparticles and zinc oxide nanoparticles. The pH adjusting property of the resulted PET textile and the resulted PP nonwoven textile containing amphoteric polymer composite nanoparticles and zinc oxide nanoparticles was similar to that of the PET textile in Example 1 and the PP nonwoven textile in Example 2. The bactericidal effect is listed in Table 3.

TABLE 3

| Tested Item | | PET textile | PP nonwoven |
|---|---|---|---|
| Staphylococcus Aureaus | Bacteriostatic value | 3.4 | 2.6 |
| | Bactericidal value | 0.9 | 0.2 |
| Klebsiella Pneumoniae | Bacteriostatic value | 4.2 | — |
| | Bactericidal value | 1.1 | — |

According to the bacteriostatic standard of the Japanese Association for the Functional Evaluation of Textiles (JAFET), a textile is bacteriostatic when the bacteriostatic value is larger than 2.2, and a textile is bactericidal when the bactericidal value is larger than zero.

From Table 3, the bacteriostatic effect and bactericidal effect of the textiles containing amphoteric polymer composite nanoparticles and zinc oxide nanoparticles were higher than the JAFET standards for bacteria of both *Staphylococcus Aureaus* and *Klebsiella Pneumoniae*.

Accordingly, the amphoteric polymer composite nanoparticles prepared in the embodiments described above have good thermal stability and ability of adjusting pH value. Hence, the amphoteric polymer composite nanoparticles can be added into polymer grains used for melt spinning and melt injecting. However, the amphoteric polymer composite nanoparticles can also be added into other spinning raw materials to enable the produced textile to have function of adjusting pH value. Moreover, nano-bactericide and other additives can also be added to increase the functions of the obtained textiles.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of producing polymer grains of synthetic fibers capable of adjusting pH values, comprising:

mixing amphoteric polymer composite nanoparticles with polymer powder for forming synthetic fibers to form a mixture;

melting, compounding and extruding the mixture;

cooling and cutting the mixture to obtain the polymer grains of synthetic fibers capable of adjusting pH values;

wherein the nanoparticles comprising a polymer core comprising a first polymer; a polymer shell surrounding the polymer core, the polymer shell comprises a second polymer having at least a carboxylic acid group and a third polymer having at least an amine group, and wherein the polymer powder of synthetic fibers comprises polyethylene terephthalate, polybutylene terephthalate, nylon, polypropylene, or polyethylene.

2. The method of claim 1, wherein shells of the amphoteric polymer composite nanoparticles comprise polyacrylamide and polyacrylic acid.

3. The method of claim 1, wherein cores of the amphoteric polymer composite nanoparticle comprise polystyrene or copolymer of styrene and acrylamide.

4. The method of claim 1, wherein a concentration of the amphoteric polymer composite nanoparticles in the mixture is about 100 to about 10,000 ppm.

5. The method of claim 1, further comprising adding a nano-bactericide in the mixture.

6. The method of claim 5, wherein the nano-bactericide comprises zinc oxide nanoparticles, titanium oxide nanoparticels, or silver nanoparticles.

7. The method of claim 6, wherein a concentration of the zinc oxide nanoparticles in the mixture is about 50 to about 5,000 ppm.

* * * * *